(12) United States Patent
Cho et al.

(10) Patent No.: US 12,043,379 B2
(45) Date of Patent: Jul. 23, 2024

(54) AIRFOIL WING-SHAPED AIRCRAFT

(71) Applicant: UIF (University Industry Foundation), Yonsei University, Seoul (KR)

(72) Inventors: Hyung Hee Cho, Seoul (KR); Seungyeong Choi, Seoul (KR); Jihyuk Kim, Daejeon (KR); Juyeong Nam, Seoul (KR); Maroosol Yun, Cheonan-si (KR); Taedoo Yoon, Seoul (KR); Minho Bang, Gyeonggi-do (KR); Joon-soo Lim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 151 days.

(21) Appl. No.: 17/493,646

(22) Filed: Oct. 4, 2021

(65) Prior Publication Data

US 2022/0106035 A1    Apr. 7, 2022

(30) Foreign Application Priority Data

Oct. 5, 2020    (KR) .......................... 10-2020-0128224

(51) Int. Cl.
*B64C 29/00*    (2006.01)
*B64C 11/00*    (2006.01)
(Continued)

(52) U.S. Cl.
CPC ........ *B64C 29/0033* (2013.01); *B64C 11/001* (2013.01); *B64C 39/10* (2013.01); *B64U 10/25* (2023.01); *B64U 2101/60* (2023.01)

(58) Field of Classification Search
CPC ....... B64C 11/001; B64C 15/02; B64C 21/02; B64C 21/04; B64C 39/10; B64C 29/0033;
(Continued)

(56) References Cited

U.S. PATENT DOCUMENTS 6,918,244 B2 *   7/2005   Dickau .................. F02K 3/025
                                                                  60/229
8,636,241 B2 *   1/2014   Lugg ..................... B64D 27/24
                                                                  244/12.3
(Continued)

FOREIGN PATENT DOCUMENTS

KR   10-2003-0049796 A   6/2003
KR   10-2010-0054158 A   5/2010
(Continued)

OTHER PUBLICATIONS

Mahamuni et al., "Aerodynamic Study of Blended Wing Body", International Journal of Applied Engineering Research, vol. 9, No. 24, Jan. 2014, pp. 29247-29255.
(Continued)

*Primary Examiner* — Woody A Lee, Jr.
*Assistant Examiner* — Justin A Pruitt
(74) *Attorney, Agent, or Firm* — WOMBLE BOND DICKINSON (US) LLP

(57) ABSTRACT

Proposed is an airfoil wing-shaped aircraft including a body having a wing-shaped longitudinal cross-section and having an upper surface on which a shape of a concave curvature-surface portion is formed along a center axis in a streamwise direction, a fluid inlet being formed in each of the opposite lateral sides of a leading portion of the body, and a fluid output being formed in each of the opposite lateral sides of a tail portion of the body, wherein a duct connects the fluid inlet and the fluid outlet to each other.

12 Claims, 5 Drawing Sheets

(51) Int. Cl.
  *B64C 39/10* (2006.01)
  *B64U 10/25* (2023.01)
  *B64U 101/60* (2023.01)

(58) Field of Classification Search
  CPC .............. B64C 29/005; B64C 29/0066; B64C 29/0083; B64C 29/04; B64C 27/10; B64C 27/14; B64C 27/20; F01N 2470/12; F01N 2470/24; B64D 33/04; B64D 2033/0273; F05D 2220/90; F05D 2220/323; F05D 2250/61; F05D 2260/606
  USPC ...................................................... 244/117 R
  See application file for complete search history.

(56) References Cited

U.S. PATENT DOCUMENTS

| | | | | |
|---|---|---|---|---|
| 8,992,172 B2* | 3/2015 | Hoeger | ..................... | F01D 9/04 |
| | | | | 415/192 |
| 9,187,174 B2* | 11/2015 | Shaw | ..................... | B64C 27/28 |
| 9,631,518 B2* | 4/2017 | Wong | ..................... | F01D 25/30 |
| 9,631,624 B2* | 4/2017 | Wong | ................... | F04D 19/022 |
| 10,822,100 B2* | 11/2020 | Dindar | ................ | H02K 7/1823 |
| 11,247,776 B2* | 2/2022 | Princen | ................... | B64C 39/10 |
| 11,465,763 B2* | 10/2022 | Kumar | ................... | B64D 27/24 |
| 2006/0096272 A1 | 5/2006 | Baughman et al. | | |
| 2007/0018034 A1* | 1/2007 | Dickau | ..................... | F02K 1/64 |
| | | | | 244/12.3 |
| 2018/0244383 A1 | 8/2018 | Valente et al. | | |
| 2019/0017468 A1* | 1/2019 | Evulet | ..................... | B64C 15/02 |
| 2021/0078701 A1* | 3/2021 | Sharifzadeh | ............ | B64C 15/02 |
| 2022/0009617 A1* | 1/2022 | Evulet | ................... | B64D 33/04 |
| 2022/0169379 A1* | 6/2022 | Sharifzadeh | ............ | F02K 1/006 |

FOREIGN PATENT DOCUMENTS

| | | |
|---|---|---|
| KR | 10-1188299 B1 | 10/2012 |
| WO | 2017/105266 A1 | 6/2017 |

OTHER PUBLICATIONS

Office Action received for Korean Patent Application No. 10-2020-0128224, mailed on Oct. 14, 2021, 5 pages of Original Document Only.

Office Action received for Korean Patent Application No. 10-2020-0128224, mailed on Mar. 29, 2022, 11 pages (6 pages of English Translation and 5 pages of Original Document).

* cited by examiner

AIRFOIL WING-SHAPED AIRCRAFT

CROSS REFERENCE TO RELATED APPLICATION

The present application claims priority to Korean Patent Application No. 10-2020-0128224, filed on Oct. 5, 2020, the entire contents of which is incorporated herein for all purposes by this reference.

BACKGROUND OF THE INVENTION

Field of the Invention

The present disclosure relates to an airfoil wing-shaped aircraft.

Description of the Related Art

In recent years, attempts have been made to transport goods using a drone (unmanned aerial vehicle) in big cities. There are problems with the drone, such as low fuel efficiency, a low lift-to-drag ratio, and a low carrying capacity. Therefore, there is an increasing demand for development of a drone having a new structure. Accordingly, an aircraft that is a type of a blended wing body (BWB) has been under development. The BWB-type aircraft is designed to maximally increase overall efficiency by integrating a propulsion system, a body, and wings into one piece. A new design concept applies to improve an existing drone in terms of Interior cabin volume, aerodynamics, noise reduction, airfare, and freight charge per mile, and the like. In addition, the BWB-type is capable of receiving a larger magnitude of lift than an aircraft in the related art. Accordingly, a passenger capacity can be increased, fuel consumption can be decreased, and a lift-to-drag ratio can be increased.

However, the BWB aircraft in the related art has been developed for intracity or intracountry passenger transportation services and thus has difficulty in intercity flight over complex geographical features, such as a mountainous area, at a low altitude.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2003-0049796 (May 25, 2003)

SUMMARY OF THE INVENTION

An objective of the present disclosure is to provide an airfoil wing-shaped aircraft capable of producing lift necessary for flight with its own body. The airfoil wing-shaped aircraft is small-sized and is optimized for high mobility. Thus, the airfoil wing-shaped aircraft is capable of flying with minimum power and of flying over complex geographical features without any restraints.

According to an aspect of the present disclosure, there is provided an airfoil wing-shaped aircraft including: a body having a wing-shaped longitudinal cross-section and having an upper surface with a concave curvature-surface portion along a center axis in a streamwise direction, a fluid inlet being formed in each of the opposite lateral sides of a leading portion of the body, and a fluid output being formed in each of the opposite lateral sides of a tail portion of the body, wherein a duct connects the fluid inlet and the fluid outlet to each other.

The airfoil wing-shaped aircraft according to the present disclosure can receive lift from the airfoil wing-shaped body and thus can improve the fuel efficiency. Particularly, with the concave curvature-surface portion formed on an upper portion of the body, flight stability can be greatly improved without a primary wing.

In addition, thrust vector control is possible with the foldable unit of the duct, and thus the airfoil wing-shaped aircraft can take off or land in a small terrain without a runway. Furthermore, the airfoil wing-shaped aircraft can be manufactured to a small size, and thus the airfoil wing-shaped aircraft can also fly over complex geographical features, such as a mountainous area, thereby maximally increasing the mobility.

In addition, the thrust generation apparatus is provided inside the body, and thus external noise of the airfoil wing-shaped aircraft can be reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
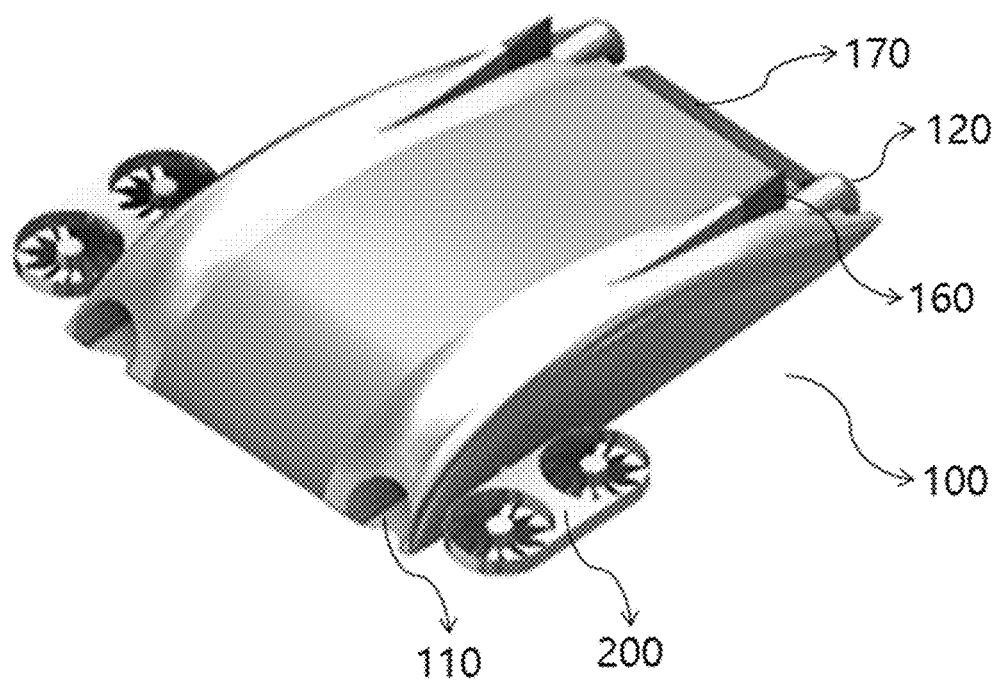
FIG. 1 is a view illustrating a schematic configuration of an airfoil wing-shaped aircraft according to an embodiment of the present disclosure.

Various modifications can be made to an embodiment of the disclosure described below, and thus various embodiments can be constructed. The resulting specific embodiment will be described in detail below with reference to the drawings. However, this description of the specific embodiment is not intended to limit the present disclosure thereto. All alterations, equivalents, and substitutes that are included within the scope of the technical idea and the technology that are described below and should be understood as falling within the scope of the present disclosure.

The terms first, second, A, B, and so on are used to describe various constituent elements without imposing any limitation thereof and are used only for the purpose of distinguish one constituent element from another, For example, a first constituent element may be expressed as a second constituent element without departing from the scope of the technology described below technology. In the same manner, the second constituent element may also be expressed as the first constituent element. The phrase "and/or" is used to join two words, phrases, or sentences or to refer to one of the two words, phrases, or sentences.

It should be understood that, throughout the present specification, the indefinite article "a/an" is used to mean one or more, not only one, except as distinctively expressed in context. It should also be understood that, throughout the present specification, the terms "include", "have", and the like are intended to indicate that a feature, a number, a step, an operation, a constituent element, a component, or any combination thereof is present, without precluding the presence or addition of one or more other features, numbers, steps, operations, constituent elements, or any combination thereof.

Before going into detail on the embodiment of the present disclosure with reference to the drawing, it should be noted that throughout the present specification, constituent elements are distinguished from each other only in terms of primary functions. That is, two or constituent elements described below may be integrated into one constituent element, or one constituent element may be divided into two more constituent elements that perform more detailed functions. Among constituent elements described below, one constituent element may perform some or all of the functions of one other constituent element in addition to a primary function thereof. Of course, some of the primary functions of one constituent element may be performed in a dedicated manner by one other constituent element.

In addition, in performing a method or an operation method, steps thereof may be performed in any order other than specified order of the steps, unless otherwise specifically stated in context. That is, the steps may be performed in order as specified, may be performed substantially at the same time, and may be performed in reverse order.

According to an aspect of the present disclosure, there is provided an airfoil wing-shaped aircraft including a body having a wing-shaped longitudinal cross-section and having an upper surface with a concave curvature-surface portion along a center axis in a streamwise direction. A fluid inlet is formed in each of the opposite lateral sides of a leading portion of the body. A fluid output is formed in each of the opposite lateral sides of a tail portion of the body. A duct connects the fluid inlet and the fluid outlet to each other.

As an implementation example of the present technology, a thrust generation apparatus may be provided inside the duct.

As an implementation example of the present technology, a foldable unit may be formed in one section of the duct, and thus the duct may be folded at the foldable unit.

As an implementation example of the present technology, the foldable unit may be formed as a corrugated pipe.

As an implementation example of the present technology, a vertical wing may be provided on each of the opposite sides of an upper surface of a rear portion of the body.

As an implementation example of the present technology, an elevator may be provided on a tail portion of the body.

As an implementation example of the present technology, the airfoil wing-shaped aircraft may further include a rotation member combined with a lateral surface of the body in a linked manner and an auxiliary fan connected to the rotation member.

As an implementation example of the present technology, a horizontal wing may be provided on the lateral surface of the body.

FIGS. 1 to 9B illustrate a configuration of an airfoil wing-shaped aircraft according to an embodiment of the present disclosure. The embodiment of the present disclosure will be described in more detail below with reference to the accompanying drawings to help with an understanding of the present disclosure. However, the embodiment is only provided toward easier understanding of the present disclosure and does not impose any limitation on the present disclosure.

FIG. 1 is a view schematically illustrating an airfoil wing-shaped aircraft according to the embodiment of the present disclosure. With reference to FIG. 1, the airfoil wing-shaped aircraft includes a body 100 and an auxiliary fan 200. The body 100 includes a fluid inlet 110, a fluid outlet 120, a duct 130, a thrust generation apparatus 140 and 141, a curvature-surface portion 150, a vertical wing 160, and an elevator 170.

The body 100 is a body portion of the airfoil wing-shaped according to the embodiment of the present. The fluid inlet 110 may be formed in each of the opposite lateral sides of a leading portion of the body 100. A fluid outlet 120 may be formed in each of the opposite lateral sides of a tail portion of the body 100. The body 100, unlike that of a general-type drone (an unmanned aerial vehicle), is not equipped with primary wings. The body 100 itself is formed in the shape of an airfoil, and therefore the longitudinal cross-section thereof may be airfoil-shaped. A sufficient magnitude of lift can be generated only with the body 100 even without an extra primary wing. When the body 100 receives a suitable magnitude of thrust from the thrust generation apparatus 140 and 141, lift may be generated. Accordingly, when a pitch angle that the body 100 makes to the horizon is increased in order to increase an angle of attack (AOA), additional lift may be generated. Particularly, with the concave curvature-surface portion 150, which is formed on the upper surface of the body 100, and the vertical wing 160, a fluid flow may be stably adjusted, and thus flight instability occurring due to the absence of a control wing on the body portion 100 may be overcome.

The body 100 is not limited to these dimensions, but it is desirable that the body 100 for a private person-owned aircraft has, for example, a length of 1 m to 5 m and a width of 1 m to 5 m so that three or fewer people can get aboard the body 100.

The fluid inlet 110 is formed in each of the opposite lateral sides of the leading portion of the body 100. Fluid is introduced into the airfoil wing-shaped aircraft through the fluid inlet 110. The fluid introduced through the fluid inlet 110 may be supplied to the thrust generation apparatus 140 and 141 provided in the duct 130 inside the body 100. The fluid inlet 110 is not limited in these cross-sections, but it is desirable that the fluid input 110 has, for example, a circular, oval, rectangular, or polygonal cross-section. A protection guide (not illustrated) allowing only fluid to pass through into the duct 130 and thus preventing introduction of other materials may be mounted in the fluid inlet 110.

The fluid outlet 120 may be formed in each of the opposite lateral sides of the tail portion of the body 100. High-speed fluid may be discharged out of the airfoil wing-shaped aircraft through the fluid outlet 120. The fluid passing through the thrust generation apparatus 140 and 141 inside the duct 130 is compressed into high-speed fluid. The high-speed fluid is discharged at a high speed through the fluid outlet 120, and thus the body 100 receives thrust. A foldable unit 131 is provided to the fluid outlet 120. With the foldable unit 131, a direction of thrust may be changed. The fluid outlet 120 is not limited in these cross-sections, but it is desirable that the fluid outlet 120 has, for example, a circular, oval, rectangular, or polygonal cross-section.

Figure 2:
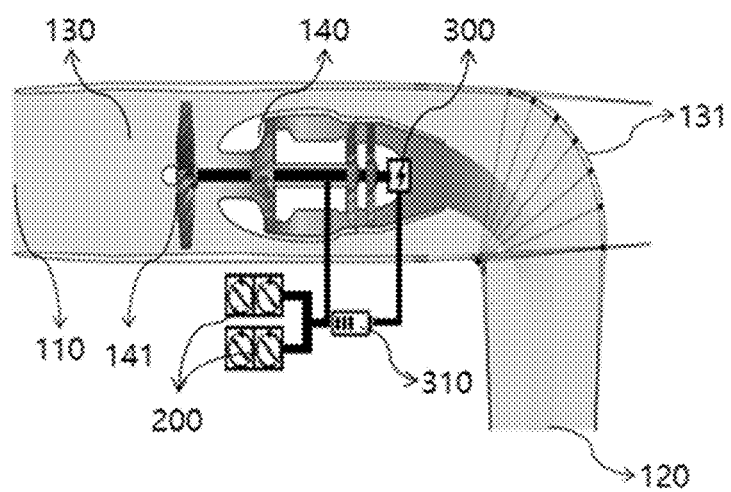
FIG. 2 is a view schematically illustrating a folded duct of the airfoil wing-shaped aircraft according to the embodiment of the present disclosure.

FIG. 2 is a view schematically illustrating a state where the duct 130 according to the embodiment of the present disclosure is folded. With reference to FIG. 2, the duct 130 connects the fluid inlet 110 and the fluid outlet 120 to each other. Fluid introduced through the fluid inlet 110 passes through the duct 130 and is transferred to the thrust generation apparatus 140 and 141. The fluid passing through the thrust generation apparatus 140 and 141 passes through the duct 130 and is discharged through the fluid outlet 120. The duct 130 may run in a straight line from the fluid inlet 110 to the fluid outlet 120. The duct 130 may vary in cross-section size according to a type of the thrust generation apparatus 140 and 141 provided therein. A section of the duct 130 that runs from the thrust generation apparatus 140 and 141 to the fluid outlet 120 may have a decreasing cross-sectional area in order to maintain compressive characteristics of the compressed high-speed fluid discharged from the thrust generation apparatus 140 and 141.

The foldable unit 131 may be formed on one section of the duct 130. The duct 130 may be folded at the foldable unit 131. With the flexible unit, a direction in which the high-speed fluid discharged after passing through the fluid outlet 120 is discharged may be changed. It is desirable that the foldable unit 131 is formed adjacent to the fluid outlet 120. When the high-speed fluid is discharged vertically to the ground through the fluid outlet 120 in a state where the duct 130 is folded downward by 90 degrees at the foldable unit 131, the airfoil wing-shaped aircraft may vertically take off and land (VTOL) or may take off and land on a short runway (STOL). In addition, with the foldable unit 131, an angle at which the duct 130 is folded may be arbitrarily changed within a predetermined range of angles. Thus, a flight attitude of the body 100 may be adjusted.

As an implementation example, the foldable unit 131 may be formed as a corrugated pipe. Flanges are provided on opposite end portions of the foldable unit 131, and the flanges are combined with each other in a linked manner. While maintaining internal diameters of circular cross-sections of opposite end portions of the foldable unit 131 to a predetermined value, the duct 130 may be folded and unfolded at the foldable unit 131 by expansion and contraction of the foldable unit 131.

Figure 3:
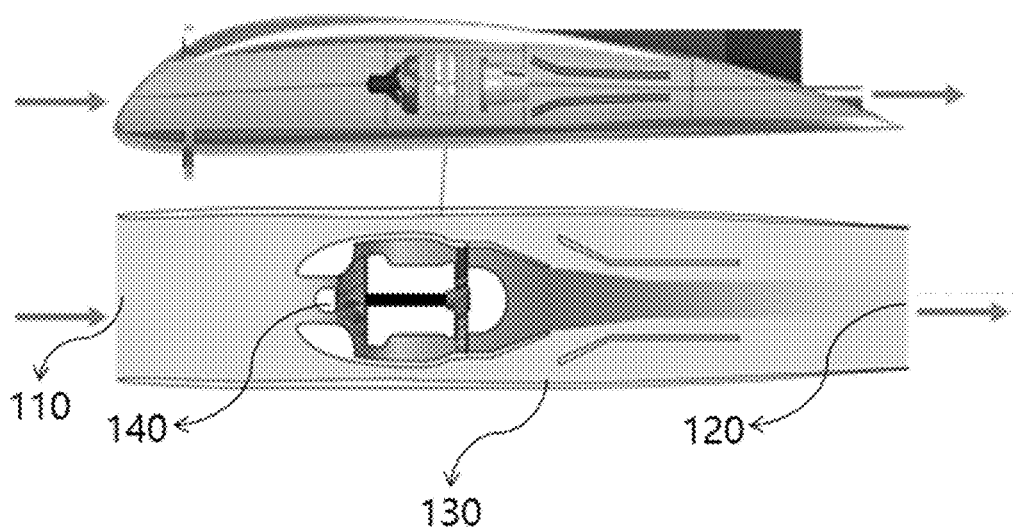
FIG. 3 is a view schematically illustrating a thrust generation apparatus (a turbojet engine) of the airfoil wing-shaped aircraft according to the embodiment of the present disclosure.
Figure 4:
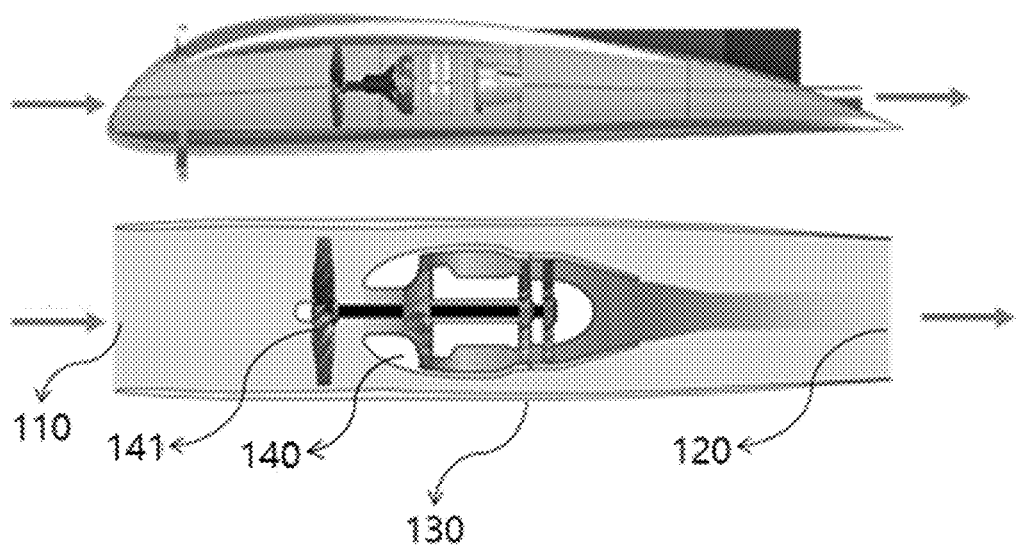
FIG. 4 is a view schematically illustrating a thrust generation apparatus (a turbofan engine) of the airfoil wing-shaped aircraft according to the embodiment of the present disclosure.

FIGS. 3 and 4 are views each schematically illustrating a shape of the thrust generation apparatus provided in the duct 130 according to the embodiment of the present disclosure. With reference to FIGS. 3 and 4, the thrust generation apparatus 140 and 141 supplies thrust necessary for the body 100 to fly forward and may be a turbojet engine or a turbofan engine. The turbojet engine or the turbofan engine is provided in the duct 130 inside the body 100. Thus, there is provided an advantage that noise to the outside of the body 100 is reduced. Particularly, the turbofan engine is equipped with a bypass duct. Thus, noise from the turbofan engine inside is further. The thrust generation apparatus 140 and 141 may include a compressor, a combustion chamber, a turbine, and the like. The compressor may compress the introduced air and may push the compressed air toward the combustion chamber in rear. The combustion chamber is arranged behind the compressor. Fuel is combusted in the combustion chamber. Fuel injected through a fuel nozzle into the combustion chamber may be mixed with the compressed air. A fuel-to-air mixture may be ignited and may be combusted. When the fuel-to-air mixture is combusted, high-temperature, high-pressure gas may be generated and may be discharged to behind the combustion chamber. A turbine is arranged behind the combustion chamber and is rotated by high-temperature, high-pressure combustion gas discharged from the combustion chamber. The turbine, along with the compressor, is combined fixedly with a shaft. Thus, as the turbine is rotated, the compressor is rotated together.

The airfoil wing-shaped aircraft according to the present embodiment may further include a generator 300 and a battery 310. The generator 300 is provided inside the thrust generation apparatus 140 and 141. The generator 300 is capable of generating electricity by utilizing turbine rotary power. The battery 310 is capable of being charged with the generated electricity. The battery 310 that is charged is electrically connected to the auxiliary fan 200 and may be used as a power source for driving the auxiliary fan 200. Thus, a hybrid system in which the battery 310 is also utilized as a power source may be established. In addition, the battery 310 may also be electrically connected to the thrust generation apparatus 140 and 141. Thus, the battery 310 may also be utilized as a power source providing power for initially rotating the turbine inside the thrust generation apparatus 140 and 141. In this case, the battery 310 may be utilized as a source providing energy necessary for starting the thrust generation apparatus 140 and 141 or necessary for flight. The thrust generation apparatus 140 and 141 may be mounted in parallel with each other inside the body 100. The thrust generation apparatus 140 and 141 on one lateral side may generate a different magnitude of thrust than the thrust generation apparatus 140 and 141 on the other lateral side. Thus, the flight attitude of the body 100 may be adjusted, and flight direction may be changed.

Figure 5:
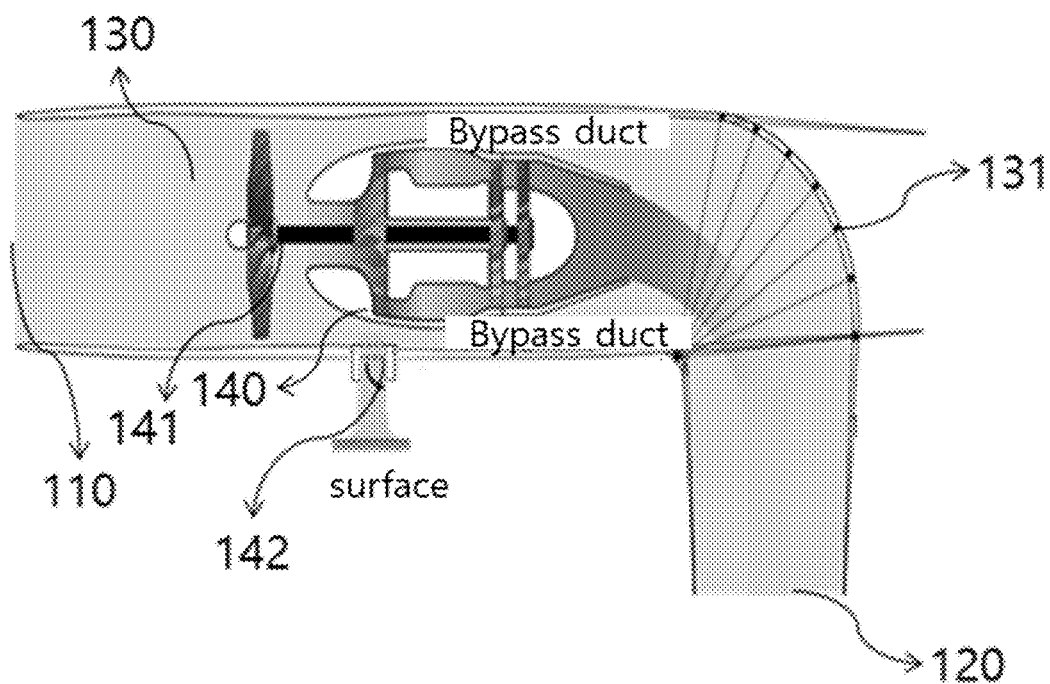
FIG. 5 is a view schematically illustrating the turbofan engine provided in the duct and a bypass nozzle and a foldable unit for vertical taking-off and landing, according to the embodiment of the present disclosure.

FIG. 5 is a view schematically illustrating a shape of a turbofan engine 140 and 141 according to an embodiment of the present disclosure that is provided in the duct 130. With reference to FIG. 5, unlike the turbojet engine, the turbofan engine 140 and 141 may include in front of the compressor a fan 141 having a greater diameter than the compressor. Thus, the turbofan engine 140 and 141 may include a flow passage along which fluid introduced into the compressor flows in the same manner as in the turbojet engine, and a bypass duct along which fluid bypasses the compressor and flows directly to the fluid outlet 120. High-speed fluid passing through the bypass duct may be used for the body 100 to receive thrust. While flowing along perimetric surfaces of the compressor, the combustion chamber, the turbine, and the like, the high-speed fluid may cool the compressor, the combustion chamber, the turbine, and the like and may reduce noise from the inside thereof.

As a specific implementation example, in a case where the thrust generation apparatus 140 and 141 is a turbo engine, the thrust generation apparatus 140 and 141 may include a bypass nozzle 142 that connects with the outside of the body 100. The bypass nozzle 142 is formed in a rear bottom portion of the fan where the bypass duct is formed inside the turbofan engine. The bypass nozzle 142 may be used in a case where a direction in which thrust resulting from a part of the fluid passing through the bypass duct is switched to the direction of the ground and where the body 100 thus vertically takes off or lands. The bypass nozzle 142 may include an opening and closing device. In a case where the body 100 needs to vertically take off or land, the bypass nozzle 142 equipped with the opening and closing device may be set to be used together with the foldable unit 131.

Figure 6:
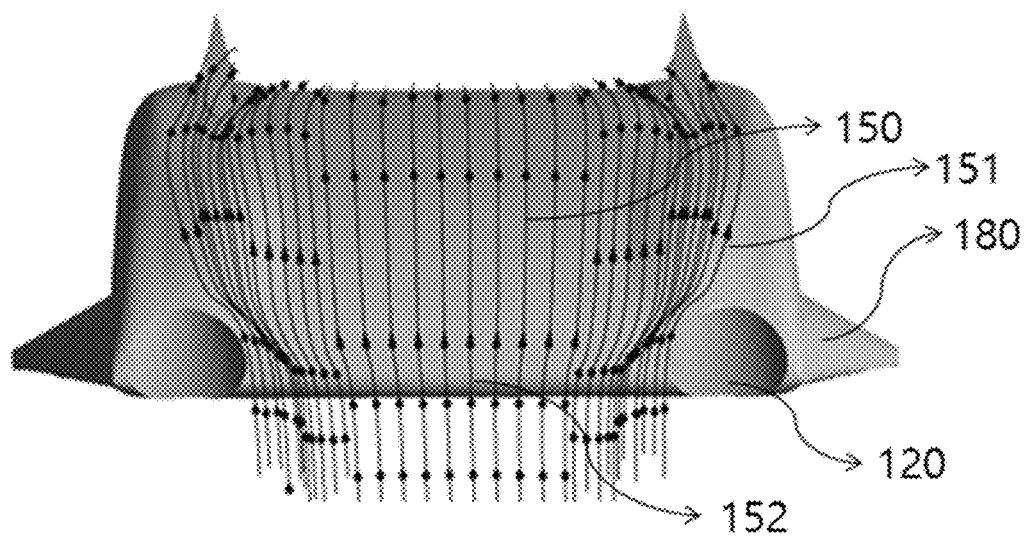
FIG. 6 is a view illustrating a curvature-surface portion on an upper surface of a body and a flow streamlines, according to the embodiment of the present disclosure.
Figures 7A, 7B:
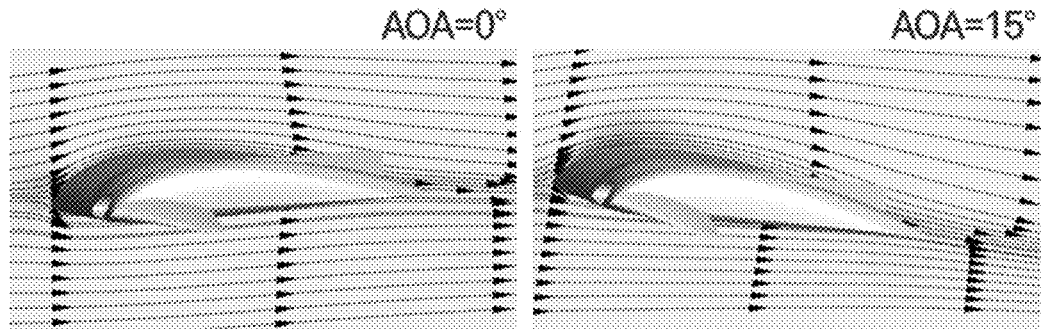
FIGS. 7A and 7B are views each illustrating the flow streamlines along the body according to the embodiment of the present disclosure.

FIG. 6 is a view schematically illustrating fluid streamlines flowing along an external surface of the body 100 according to the shape of the concave curvature-surface portion formed on the body 100 according to the embodiment of the present disclosure. FIGS. 7A and 7B are views each schematically illustrating fluid streamlines flowing along the external surface of the body 100 according to the angle of attack. With reference to FIGS. 6, 7A, and 7B, the curvature-surface portion 150 may be formed on the upper surface of the body 100 to a shape that is concavely curved from the leading portion to the tail portion along the streamwise direction. The curvature-surface portion 150 and the vertical wing 160 can improve flight stability by causing fluid flowing along the external surface of the body 100 to concentrate in the curvature-surface portion 150. Unlike a general-type aircraft, the airfoil wing-shaped aircraft according to the embodiment of the present invention has no primary wings. Therefore, it is particularly important to improve the flight stability. The flow of the fluid along the external surface of the body 100 may be adjusted with the curvature-surface portion 150 and the vertical wing 160. Thus, the flight attitude may be stably maintained, and the left and right sides may be kept in balance. Furthermore, because the fluid is forced to flow toward the curvature-surface portion 150, although the angle of attach (AOA) of the body 100 is increased to obtain a large magnitude of lift, a flow separation phenomenon can be maximally delayed on the upper surface of the body 100. The curvature-surface portion 150 may include a first fluid guide portion 151 having a predetermined width and a predetermined height along the lengthwise direction. The first fluid guide portion 151 may be formed on opposite lateral sides of the curvature-surface portion 150. It is desirable that the first fluid guide portion 151 is formed to have a greater height than at least the curvature-surface portion 150. The first fluid guide portion 151 forces the fluid flowing along the upper surface of the body 100 to flow toward the curvature-surface portion 150. Thus, an improvement in the flight stability can be achieved. A second fluid guide portion 152 may be formed on an end portion in the streamwise direction of the curvature-surface portion 150. A second fluid guide portion 152 is a curvature-surface portion that has a narrower and more concavely curved surface than the curvature-surface portion 150. The second fluid guide portion 152 further forces the fluid flowing along the curvature-surface portion 150 to flow between the fluid outlets 120. Thus, the flow of the fluid can be adjusted in such a manner that the flow of the fluid is separated from the upper surface of the body 100.

The vertical wing 160 is provided on each of the opposite sides of the upper surface of the rear portion of the body 100 in order to change the direction of the airfoil wing-shaped aircraft according to the embodiment of the present disclosure and to keep the left and right sides of the airfoil wing-shaped aircraft in balance. The vertical wing 160 is mounted along a streamwise direction of the body 100. A rudder (not illustrated) is connected to the vertical wing 160 in a hinged manner. Thus, the rudder may be rotated within a predetermined range of angles about hinge axis. It is desirable that the vertical wing 160 is arranged on the upper surface of the tail portion of body 100 in such a manner as to be positioned farthest away from the center of gravity of the body 100. The reason for this is because rotation of the rudder by a small angle results in rotation of the body 100 by a large angle.

The elevator 170 is provided on the tail portion of the body 100. The elevator 170 may adjust the flight attitude of the body 100 and thus may increase the angle of attack of the body 100. Thus, when taking off and landing, the airfoil wing-shaped aircraft may receive a large magnitude of lift even at a low speed. The elevator 170 may be connected to the tail portion of the body 100 with a hinge. The elevator 170 may adjust the lift by being rotated in an upward-downward direction about the hinge. The curvature-surface portion, along with the body 100, may form a streamlined shape in a state where the elevator 170 is not rotated. When the elevator 170 is rotated downward by a predetermined angle, the angle of attack is increased by an overall shape that is formed by the body 100 and the elevator 170. Consequently, as is the case with the increase in the pitch angle that the body 100 makes to the horizon, the body 100 receives a large magnitude of lift. However, in this case, drag that is received by the body 100 is also increased. Therefore, it is desirable that the rudder 170 is rotated within a suitable range of angles. The elevator 170 is not limited in this mounting position, but it is desirable that the elevator 170 is mounted between the fluid outlets 120 in the opposite lateral sides of the tail portion toward which air is forced to flow.

In addition, with the elevator 170, the pitch angle that the body 100 makes to the horizon may be adjusted. Therefore, it is desirable that the elevator 170 is arranged on the tail portion of the body 100 in such a manner as to be positioned farthest away from the center of gravity of the body 100. The reason for this is because the rotation of the elevator 170 by a small angle results in a great increase in the pitch angle that the body 100 makes to the horizon.

The horizontal wing 180 serves to adjust the flight attitude of the body 100 and to maintain the flight stability. For this reason, the horizontal wing 180 may be provided on the lateral surface of the body 100. The horizontal wing 180 may have a streamlined cross-section in longitudinal direction and thus may receive the lift. However, in the airfoil wing-shaped aircraft according to the embodiment of the present disclosure, the lift generated with the body 100 itself accounts for much of the total lift. A magnitude of lift generated with the horizontal wing 180 having a smaller size than the body 100 is smaller than a magnitude of lift generated with the body 100. The horizontal wing 180 may include a flip (not illustrated) at the end portion thereof.

Figures 8A, 8B:
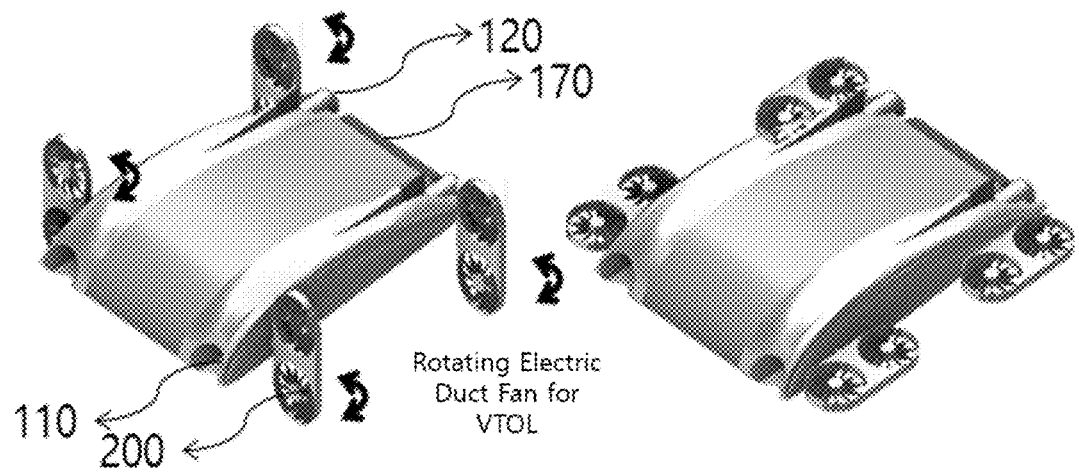
FIGS. 8A and 8B are views each illustrating an auxiliary fan connected to the body according to the embodiment of the present disclosure.
Figures 9A, 9B:
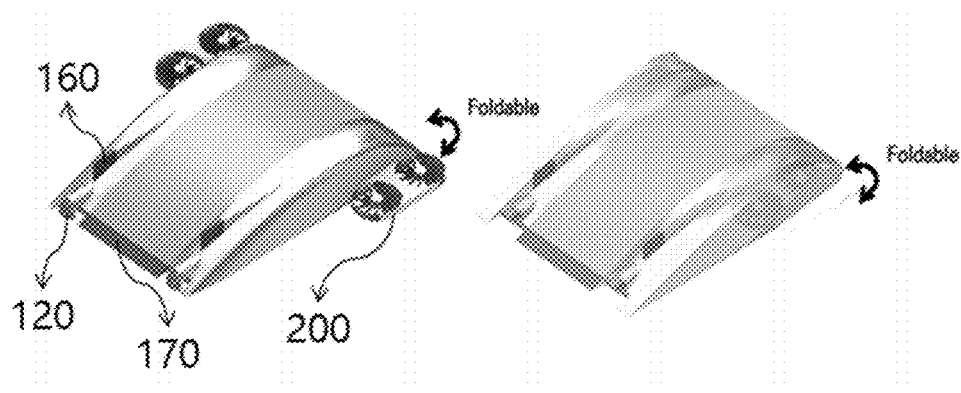
FIGS. 9A and 9B are views each illustrating the auxiliary fan connected to the body according to the embodiment of the present disclosure.

FIGS. 8A, 8B, 9A, and 9B are views each illustrating the auxiliary fan 200 connected to the body 100 according to the embodiment of the present disclosure. With reference to FIGS. 8A and 8B, with thrust generated with the auxiliary fan 200, the airfoil wing-shaped aircraft according to the embodiment of the present disclosure may ascend or descend for vertical taking-off or landing. The auxiliary fan 200 may be combined with the lateral surface of the body 100 in a hinged or linked manner using a rotation member (not illustrated). The rotation member may include a first rotation shaft in parallel with the streamwise direction of the body 100 and a second rotation shaft vertical to the first rotation shaft. The auxiliary fan 200 may be rotated about the first rotation shaft of the rotation member. Thus, the auxiliary fan 200 may be rotatably movable from the lateral surface of the body 100 to under the body 100. In addition, the rotation member is moved in a reverse direction, and thus the auxiliary fan 200 is positioned on the lateral surface of the body 100. At this time, the second rotation shaft of the rotation member is positioned in a direction vertical to the lateral surface of the body 100, and the auxiliary fan 200 is rotated about the second rotation shaft and is tilted. In order for the body 100 to fly forward, the auxiliary fan 200 may be rotated about the second rotation shaft in such a manner as to be vertical to the flight direction and thus may be tilted. Alternatively, in order for the body 100 to ascend or descend for vertical taking-off or landing, the auxiliary fan 200 may be rotated in such a manner as to be in parallel with the flight direction and thus may be tilted. The auxiliary fan 200 may be tilted at only an arbitrary angle within a predetermined range of angles with respect to the second rotation shaft in order to adjust the attitude of the body 100. The auxiliary fans 200 on opposite lateral surfaces of the body 100 may be set to produce different magnitudes of thrust in order to change the flight direction.

As a specific implementation example, the auxiliary fan 200 may have a shape of a wing streamlined from the front end to the rear end. An opening and closing device (not illustrated) may be provided on each of the upper and lower portions of the auxiliary fan 200. The opening and closing device may be a guide vane. The guide vane is configured to include a plurality of rotation wings. Each rotation wing may be rotated about a rotation shaft thereof and may open and close the upper and lower portions of the auxiliary fan 200. In a case where a fan cover closes the auxiliary fan 200, since the auxiliary fan 200 has the shape of a streamlined wing, the auxiliary fan 200 may generate lift from the lateral surface of the body 100.

The embodiment of the present disclosure is described above, and the present disclosure is not limited to the embodiments. Amendments or alterations may be made to the embodiment without departing the nature and gist of the present disclosure and the scope of the present disclosure, and the amendments and the alternations would also be apparent to a person of ordinary skill in the art to which the present disclosure pertains.

What is claimed is:

1. An airfoil wing-shaped aircraft comprising:
    a body having a wing-shaped longitudinal cross-section and having an upper surface on which a concave curvature-surface portion is formed along a center axis in a streamside direction, said concave curvature-surface portion including a first fluid guide portion, a fluid inlet being formed in each of opposite lateral sides of a leading portion of the body, and a fluid outlet being formed in each of the opposite lateral sides of a tail portion of the body, said concave surface portion extending continuously and contiguously in a lateral direction between said fluid inlet and fluid outlet pairs,
    wherein a duct connects the fluid inlet and the fluid outlet to each other, and
    wherein a second fluid guide portion is formed on an end portion of the curvature-surface portion in a streamwise direction of the curvature-surface portion and includes a curvature-surface portion that has a narrower and more concavely curved surface than the curvature-surface portion of the body.

2. The airfoil wing-shaped aircraft of claim 1, wherein a thrust generation apparatus is provided inside the duct.

3. The airfoil wing-shaped aircraft of claim 2, wherein a bypass nozzle connecting with an inside of the thrust generation apparatus and the outside of the body is provided on a bottom portion of the thrust generation apparatus.

4. The airfoil wing-shaped aircraft of claim 1, wherein a foldable unit is formed on one section of the duct, and the duct is foldable at the foldable unit.

5. The airfoil wing-shaped aircraft of claim 4, wherein the foldable unit is formed as a corrugated pipe.

6. The airfoil wing-shaped aircraft of claim 1, wherein a vertical wing is provided on each of the opposite lateral sides of an upper surface of a rear portion of the body.

7. The airfoil wing-shaped aircraft of claim 1, wherein an elevator is provided on the tail portion of the body.

8. The airfoil wing-shaped aircraft of claim 1, further comprising:
    a rotation member connected to a lateral surface of the body in a linked manner; and
    an auxiliary fan connected to the rotation member.

9. The airfoil wing-shaped aircraft of claim 1, wherein a vertical wing is provided on a lateral surface of the body.

10. The airfoil wing-shaped aircraft of claim 2, further comprising:
    a generator; and
    a battery,
    wherein the generator generates electricity with rotary power by the thrust generation apparatus inside the thrust generation apparatus and is electrically connected to the battery and the battery is charged with the generated electricity.

11. The airfoil wing-shaped aircraft of claim 10, wherein the battery is electrically connected to an auxiliary fan.

12. The airfoil wing-shaped aircraft of claim 10, wherein the battery is electrically connected to the thrust generation apparatus.

* * * * *